(12) United States Patent
Rajput

(10) Patent No.: US 12,047,897 B2
(45) Date of Patent: *Jul. 23, 2024

(54) MULTIPLE CONTEXT ISSUE FOR SINGLE UE IN THE NETWORK

(71) Applicant: Parallel Wireless, Inc., Nashua, NH (US)

(72) Inventor: Mahendra Singh Rajput, Bangalore (IN)

(73) Assignee: Parallel Wireless, Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/973,104

(22) Filed: Oct. 25, 2022

(65) Prior Publication Data

US 2023/0042386 A1  Feb. 9, 2023

Related U.S. Application Data

(63) Continuation of application No. 17/195,360, filed on Mar. 8, 2021, now Pat. No. 11,483,790.

(60) Provisional application No. 62/986,350, filed on Mar. 6, 2020.

(51) Int. Cl.
*H04W 60/00* (2009.01)
*H04W 60/06* (2009.01)

(52) U.S. Cl.
CPC ......... *H04W 60/005* (2013.01); *H04W 60/06* (2013.01)

(58) Field of Classification Search
CPC .......................... H04W 60/005; H04W 60/06
See application file for complete search history.

(56) References Cited

U.S. PATENT DOCUMENTS

| | | | |
|---|---|---|---|
| 10,736,071 B2* | 8/2020 | Fernandez Galmes | H04W 8/12 |
| 11,483,790 B2* | 10/2022 | Rajput | H04W 60/06 |
| 2018/0041934 A1* | 2/2018 | Agarwal | H04W 64/003 |

* cited by examiner

*Primary Examiner* — Marisol Figueroa
(74) *Attorney, Agent, or Firm* — Michael Y. Saji

(57) ABSTRACT

Systems, methods and computer software are disclosed for resolving multiple contexts for a User Equipment (UE) in a wireless network. In one embodiment a method includes maintaining, for a coordinating node hosting a first Radio Access Technology (RAT) controller and a second RAT controller simultaneously, a centrally maintained database; determining, based on the contents of the centrally maintained database, when the UE is registering with the second RAT controller while currently registered with the first RAT controller; and sending, by the second RAT controller, a deregistration command to the first RAT controller the UE was registered with, wherein context is freed and wherein resources held at both the coordinating node and at a base station are freed.

18 Claims, 5 Drawing Sheets

MULTIPLE CONTEXT ISSUE FOR SINGLE UE IN THE NETWORK

CROSS-REFERENCE TO RELATED APPLICATIONS

This application is a continuation of U.S. application Ser. No. 17/195,360, filed Mar. 8, 2021, which claims priority under 35 U.S.C. § 119(e) to U.S. Provisional Pat. App. No. 62/986,350, filed Mar. 6, 2020, titled "Multiple Context Issue for Single UE in a Network", each of which is hereby incorporated by reference in its entirety for all purposes. The present application hereby incorporates by reference U.S. Pat. App. Pub. Nos. US20110044285, US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. patent application Ser. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. Pat. App. No. 62/375,341, "S2 Proxy for Multi-Architecture Virtualization," filed Aug. 15, 2016; U.S. patent application Ser. No. 15/132,229, "Max-Mesh: Mesh Backhaul Routing," filed Apr. 18, 2016, each in its entirety for all purposes. This application also hereby incorporates by reference in their entirety each of the following U.S. Pat. applications or Pat. App. Publications: US20150098387A1; US20170055186A1; US20170273134A1; US20170272330A1; and Ser. No. 15/713,584. This application also hereby incorporates by reference in their entirety U.S. patent application Ser. No. 16/424,479, "5G Interoperability Architecture," filed May 28, 2019; and U.S. Provisional Pat. Application No. 62/804,209, "5G Native Architecture," filed Feb. 11, 2019.

BACKGROUND

In certain situations, User Equipment (UE) context is maintained in two Radio Access Technology (RATs) at the same time leading to inefficient usage of resources. When a UE enters in 3G cell, it registers with Home NodeB Gateway (HNBGW) via a Radio Network Controller (RNC) via a Converged Wireless System (CWS) (Home NodeB). After releasing the Iu, to optimize the reregistration, the UE stays with HNBGW till Idle UE timeout. While Idle UE timeout is running, if the UE moves to 2G cell, it registers in 2G RAT with BSC.

Since UE has changed the RAT in Idle mode, the old RAT doesn't get any indication as controllers are independently handling the respective RATs. So, it leads to multiple UE contexts maintained in the network (two RATs). If Idle timer is high and with smaller cells, it may lead to multiple contexts for a single UE, hence, resource waste.

SUMMARY

A method for resolving multiple contexts for a UE in a wireless network is described. In one embodiment, the method includes maintaining, for a coordinating node hosting 2G and 3G RAT controllers simultaneously, a centrally maintained database; determining, based on the contents of the centrally maintained database, when the UE is registering with a different RAT controller other than the currently registered RAT controller; and sending, by the new RAT controller, a deregistration command to an original RAT controller the UE was registered with, wherein context is freed and wherein resources held at both the coordinating node and at a base station are freed.

In another embodiment, a system for resolving multiple contexts for a User Equipment (UE) in a wireless network is described. The system includes a UE; a first Radio Access Technology (RAT) controller in communication with the UE; a second Radio Access Technology (RAT) controller in communication with the UE; a coordinating node hosting a first Radio Access Technology (RAT) controller and a second RAT controller simultaneously, and maintaining a central database. The coordinating host determines, based on the contents of the centrally maintained database, when the UE is registering with the second RAT controller while currently registered with the first RAT controller; and wherein the second RAT controller sends a deregistration command to the first RAT controller the UE was registered with, and wherein context is freed and wherein resources held at both the coordinating node and at a base station are freed.

In another embodiment, a non-transitory computer-readable medium containing instructions for resolving multiple contexts for a User Equipment (UE) in a wireless network which, when executed, cause a coordinating node to perform steps comprising: maintaining, for a coordinating node hosting a first Radio Access Technology (RAT) controller and a second RAT controller simultaneously, a centrally maintained database; determining, based on the contents of the centrally maintained database, when the UE is registering with the second RAT controller while currently registered with the first RAT controller; and sending, by the second RAT controller, a deregistration command to the first RAT controller the UE was registered with, wherein context is freed and wherein resources held at both the coordinating node and at a base station are freed.

DETAILED DESCRIPTION

While the following description references 2G and 3G RATS, it should be appreciated that other different combinations of RATs may be used, including but not limited to, 2G and 4G, 4G and 5G, and 5G Sa and 5G NSA. The presently described method for resolving multiple contexts for a UE in a wireless network incorporates the use of a single data structure to handle data contexts for different RATS used concurrently (e.g. 2G and 4G).

The method described herein operates by using a hardware identifier of a UE (e.g., an IMSI) to look up whether a context is active at any of a plurality of virtual RAT controllers hosted at a single controller or coordinating node; and, if multiple contexts are found, performing a deregistration process sending message from one or more RAT controllers to the new RAT controller where the UE is requesting registration. This allows data to be efficiently forwarded in a manner similar to the way intra-RAT handovers are performed, and reduces wasted overhead by having UE contexts being held open unnecessarily after UEs are registered on other RATs.

The issue of having multiple contexts for a single UE in a Network can be addressed as described below.

Figure 1:
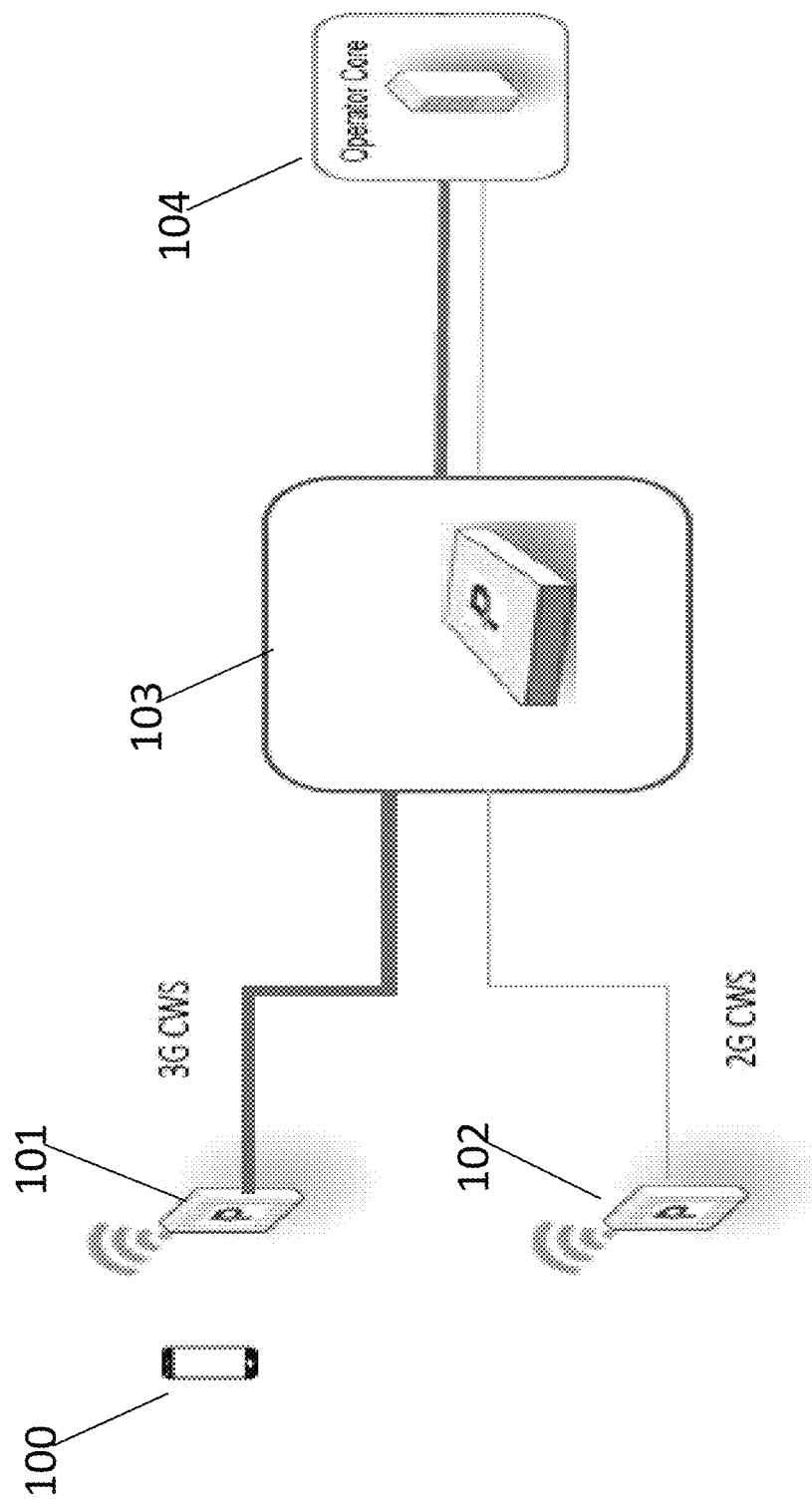
FIG. 1 is a system diagram showing multiple contexts for a single UE.

Referring to FIG. 1, a system including a UE 100 in communication with a first base station 101m a controller 103 and a core network 104. Also shown in a second base station 102 which UE 100 may be in communication with.

In one example, the UE 101 is attached in a 3G domain and connected with an Operator Core 104. The solid line depicts the UE session carried over the connection.

In a further example, the Iu is released and UE becomes Idle. In another example, the UE connected in 2G base station 102 and connected to operator core 204. The UE is maintaining two contexts now. First one in vRNC context (Idle Mode) and second one in vBSC context (connected mode) until a local cleanup timer is triggered. While this timer is running, if UE goes to a third base station (possible case in femto deployments) which is connected via different vRNC, it will create one more context.

Without coordinating node, the RNC and BSC are two different nodes and will have no idea of state of UE contexts in the network. So, this problem has high chances of occurrences.

When UE comes back to Old RAT (3G) in connected mode, it leads to additional synchronization as UE context is already existing between RAN node and RAN controller.

In case of small cells when Idle mode movement is more, there are more chances of call disconnect due to relocation failure, when UE is moving back to the cell which has already registered the UE in connected mode.

Proposed Solution:

With coordinating node hosting 3G/2G RAT controllers (vRNC/vBSC) simultaneously, the database based on key (IMS/IMEI) shall be centrally maintained. This database shall contain basic context information (IMSI, context-id, RAT, Virtual Node Id) plus location understandable by RAT (LA/RA/TA) which a UE is serving.

If UE is registering with RAT other than currently registered RAT, new RAT controller (vBSC) shall send a deregistration command to old RAT controller (vRNC). The old RAT controller shall perform deregistration of UE with base station (CWS(nodeB)). This lead to freeing the context and resources held at both vRNC (HNBGW) and CWS (HNB). This shall be possible if UE is moving between access nodes connected to HNG.

Figure 2:
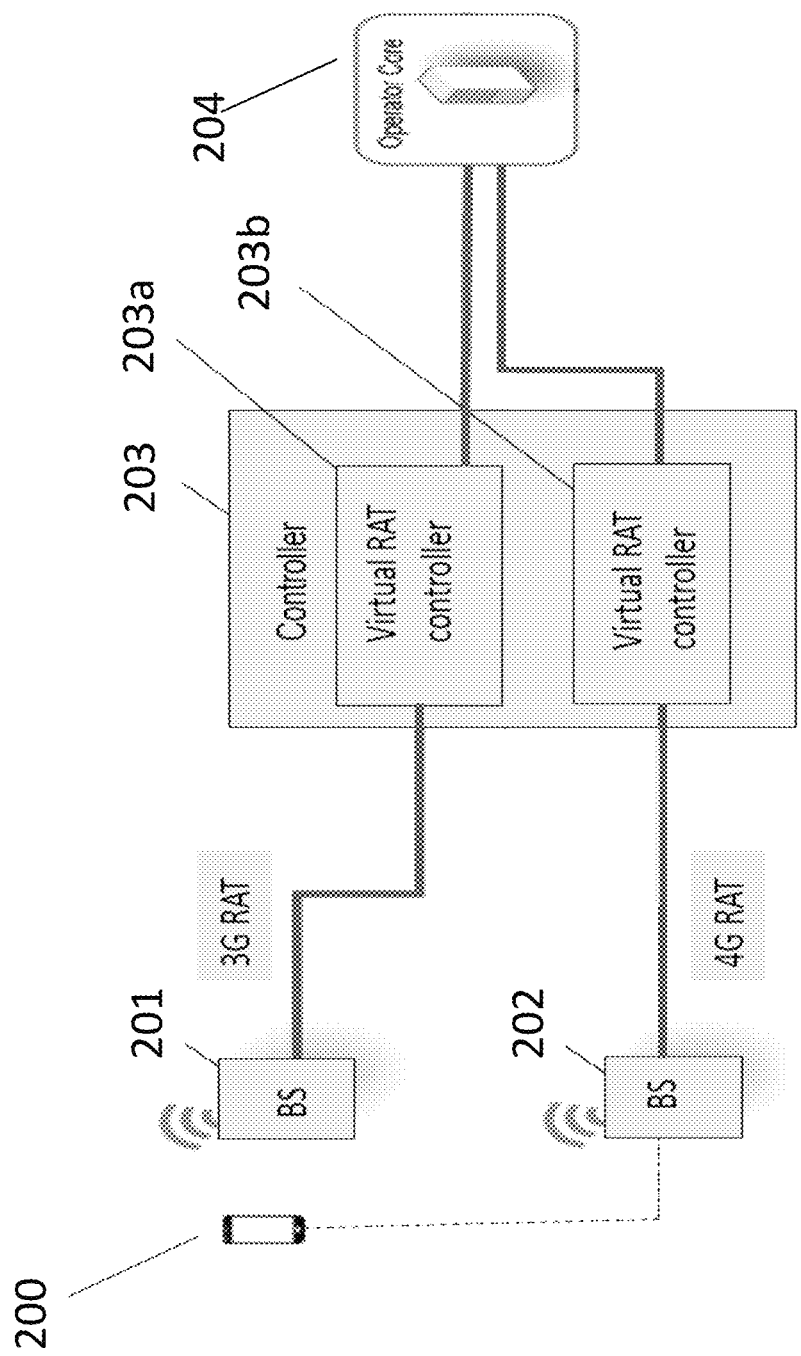
FIG. 2 is a system diagram showing a system for handling multiple contexts for a single UE in accordance with some embodiments.

FIG. 2 shows a system including includes a controller 203 in communication with base stations 201 and 202. Base station 201 supports a 3G RAT. Base station 202 supports a 4G RAT. Controller 203 includes virtual RAT controller 203a and virtual RAT controller 203b. Virtual RAT controller 203a supports 3G and is in communication with base station 201. Virtual RAT controller 203b supports 4G and is in communication with base station 202. The virtual RAT controllers may be virtualizing gateways as described elsewhere herein or in the documents incorporated by reference above. In operation, when a UE 200 moves from base station 201 to base station 202 and requests registration at base station 202, base station 202 sends a message for registration of the UE to virtual RAT controller 203b. Virtual RAT controller 203b requests virtual RAT controller 203a to check whether a device with a hardware identifier used by UE 200. In some embodiments this may be performed using IPC or shared data structures or shared memory and not by sending a message. Continuing on, when virtual RAT controller 203a indicates that the UE was previously active on base station 202 and has an active context at virtual RAT controller 203a, a messaging flow is initiated between virtual RAT controller 203a and virtual RAT controller 203b to deregister the UE at virtual RAT controller 203a and in some embodiments to transition any active data flows to virtual RAT controller 203b on a 4G RAT.

The Database shall be used to maintain the Location information of the UE with respective RAT. This shall be augmented with additional parameters like Time of the day to define the probability of when the UE shall be found during particular location, particular time of day. Using this information, the virtual nodes in HetnetGateway like vENB, vRNC, vBSC shall page the UE in more deterministic way.

vENB and MME shall make use of the DB to identify the most appropriate location at Tracking area level for the UE in 4G domain.

It should be appreciated that the above described multiple context issue for single UE in a network is also applicable to other RATs, including but not limited to 2G and 4G; 4G and 5G; 5G NSA and 5G SA. It should also be appreciated that any combination of 2 RATs, any combination of 3 RATs, etc. is enabled by the present disclosure; interworking between any 2 RATs is enabled by the present disclosure; virtualization of any RAT at the core (stand-alone or non-standalone) or at the RAN to appear as another RAT is enabled by the present disclosure; changing of operational parameters of any RAT based on environment variables of any RAT is contemplated; addition of one or more additional RF chains is contemplated, in some embodiments, to support the processing requirements of any particular RAT, which in combination with the multi-RAT architecture disclosed herein enables a multi-RAT node with any combination of RATs. The inventors have also considered the use of the present methods and systems to support a combination of multiple contexts for three or more contexts.

Figure 3:
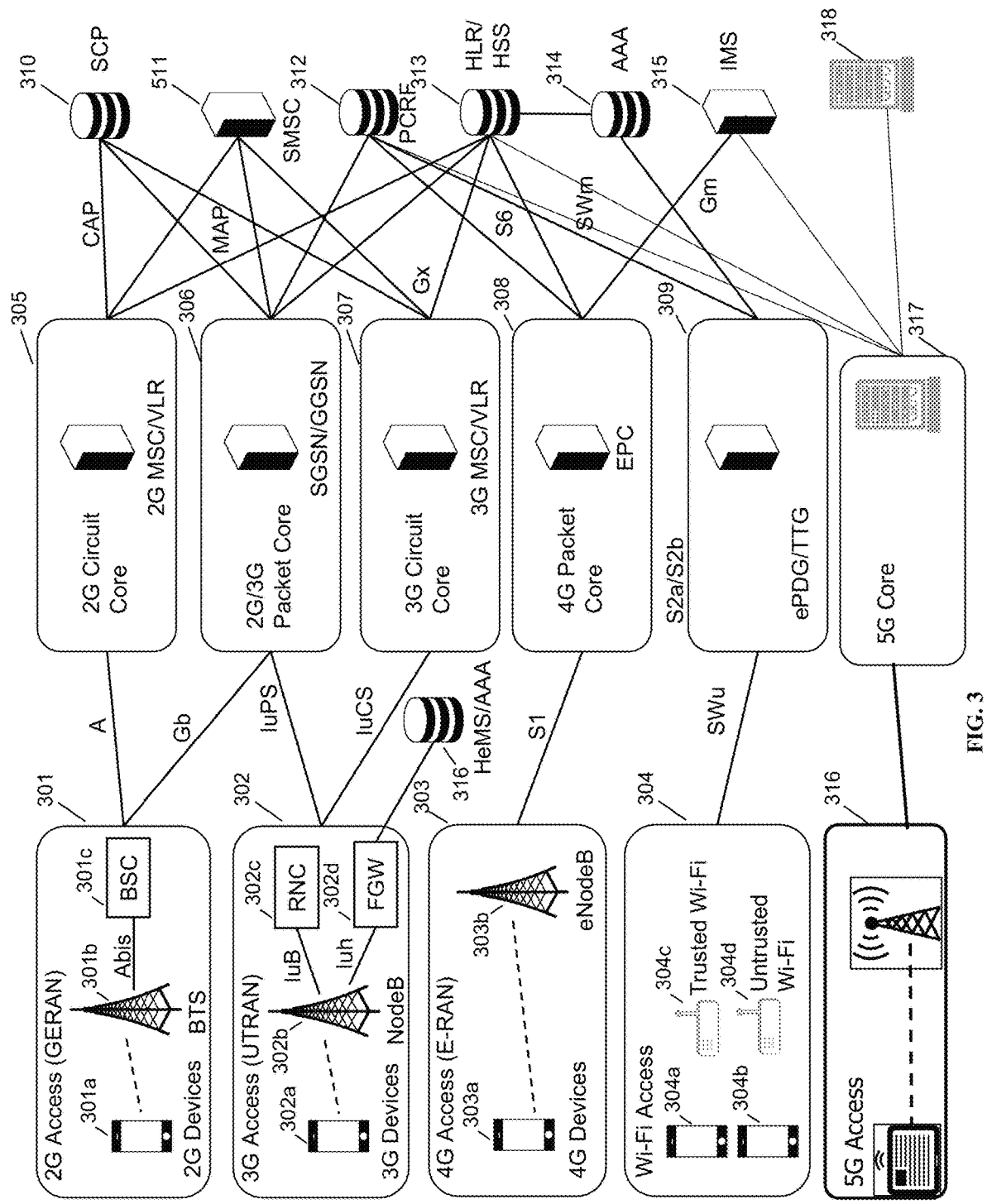
FIG. 3 is a schematic network architecture diagram for various radio access technology core networks.

FIG. 3 is a schematic network architecture diagram for 3G and other-G prior art networks. The diagram shows a plurality of "Gs," including 2G, 3G, 4G, 5G and Wi-Fi. 2G is represented by GERAN 101, which includes a 2G device 301a, BTS 301b, and BSC 301c. 3G is represented by UTRAN 302, which includes a 3G UE 302a, nodeB 302b, RNC 302c, and femto gateway (FGW, which in 3GPP namespace is also known as a Home nodeB Gateway or HNBGW) 302d. 4G is represented by EUTRAN or E-RAN 303, which includes an LTE UE 303a and LTE eNodeB 303b. Wi-Fi is represented by Wi-Fi access network 304, which includes a trusted Wi-Fi access point 304c and an untrusted Wi-Fi access point 304d. The Wi-Fi devices 304a and 304b may access either AP 304c or 304d. In the current network architecture, each "G" has a core network. 2G circuit core network 305 includes a 2G MSC/VLR; 2G/3G packet core network 306 includes an SGSN/GGSN (for EDGE or UMTS packet traffic); 3G circuit core 307 includes a 3G MSC/VLR; 4G circuit core 308 includes an evolved packet core (EPC); and in some embodiments the Wi-Fi access network may be connected via an ePDG/TTG using S2a/S2b. Each of these nodes are connected via a number of different protocols and interfaces, as shown, to other, non- "G"-specific network nodes, such as the SCP 330, the SMSC 331, PCRF 332, HLR/HSS 333, Authentication, Authorization, and Accounting server (AAA) 334, and IP Multimedia Subsystem (IMS) 335. An HeMS/AAA 336 is present in some cases for use by the 3G UTRAN. The diagram is used to indicate schematically the basic functions of each network as known to one of skill in the art, and is not intended to be exhaustive. For example, 5G core 317 is shown using a single interface to 5G access 316, although in some cases 5G access can be supported using dual connectivity or via a non-standalone deployment architecture.

Noteworthy is that the RANs 301, 302, 303, 304 and 336 rely on specialized core networks 305, 306, 307, 308, 309, 337 but share essential management databases 330, 331, 332, 333, 334, 335, 338. More specifically, for the 2G GERAN, a BSC 301c is required for Abis compatibility with BTS 301b, while for the 3G UTRAN, an RNC 302c is required for Iub compatibility and an FGW 302d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 4:
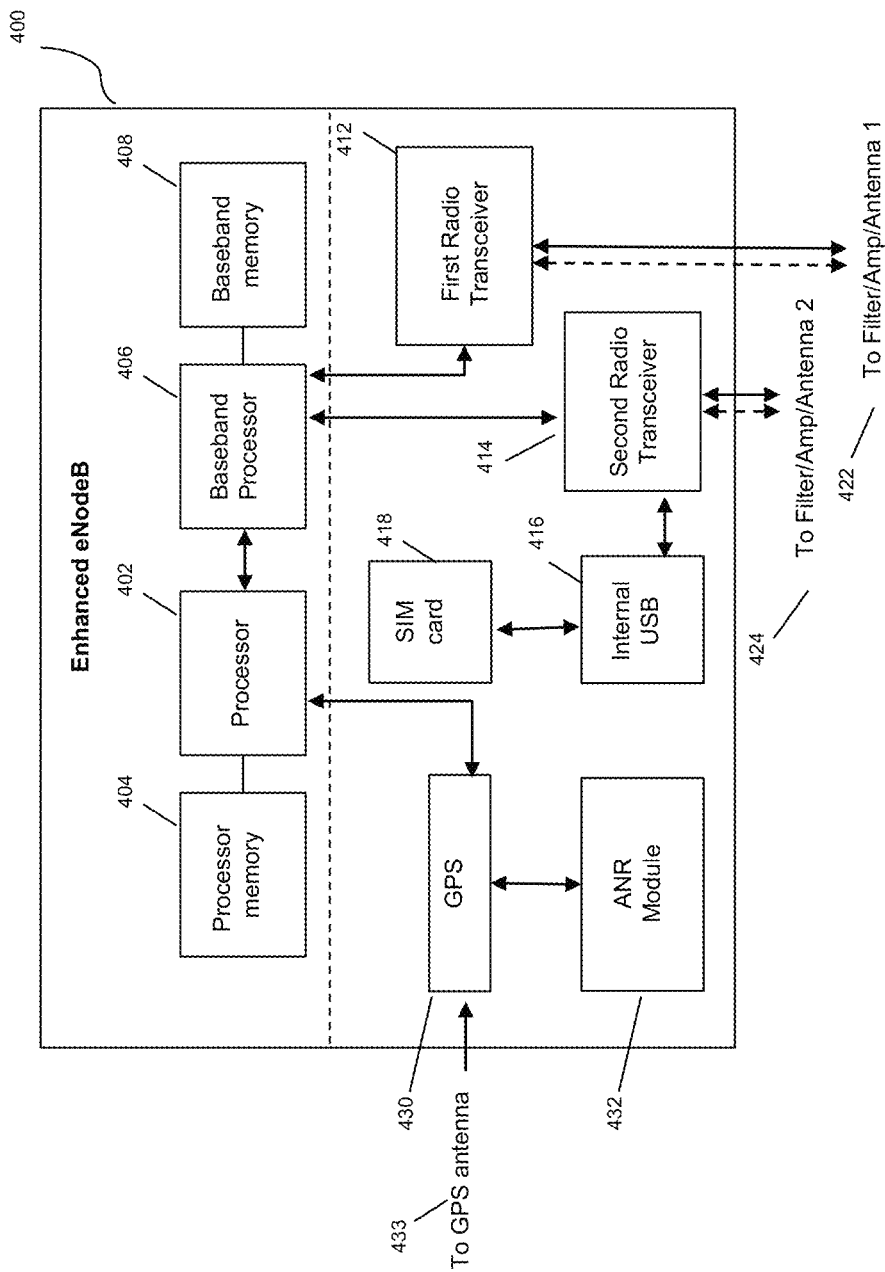
FIG. 4 is an enhanced eNodeB for performing the methods described herein, in accordance with some embodiments.

FIG. 4 is a diagram of an enhanced eNodeB for performing the methods described herein, in accordance with some embodiments. eNodeB 400 may include processor 402, processor memory 404 in communication with the processor, baseband processor 406, and baseband processor memory 408 in communication with the baseband processor. Mesh network node 400 may also include first radio transceiver 412 and second radio transceiver 414, internal universal serial bus (USB) port 416, and subscriber information module card (SIM card) 418 coupled to USB port 416. In some embodiments, the second radio transceiver 414 itself may be coupled to USB port 416, and communications from the baseband processor may be passed through USB port 416. The second radio transceiver may be used for wirelessly backhauling eNodeB 400.

Processor 402 and baseband processor 406 are in communication with one another. Processor 402 may perform routing functions, and may determine if/when a switch in network configuration is needed. Baseband processor 406 may generate and receive radio signals for both radio transceivers 412 and 414, based on instructions from processor 402. In some embodiments, processors 402 and 406 may be on the same physical logic board. In other embodiments, they may be on separate logic boards.

Processor 402 may identify the appropriate network configuration, and may perform routing of packets from one network interface to another accordingly. Processor 402 may use memory 404, in particular to store a routing table to be used for routing packets. Baseband processor 406 may perform operations to generate the radio frequency signals for transmission or retransmission by both transceivers 410 and 412. Baseband processor 406 may also perform operations to decode signals received by transceivers 412 and 414. Baseband processor 406 may use memory 408 to perform these tasks.

The first radio transceiver 412 may be a radio transceiver capable of providing LTE eNodeB functionality, and may be capable of higher power and multi-channel OFDMA. The second radio transceiver 414 may be a radio transceiver capable of providing LTE UE functionality. Both transceivers 412 and 414 may be capable of receiving and transmitting on one or more LTE bands. In some embodiments, either or both of transceivers 412 and 414 may be capable of providing both LTE eNodeB and LTE UE functionality. Transceiver 412 may be coupled to processor 402 via a Peripheral Component Interconnect-Express (PCI-E) bus, and/or via a daughtercard. As transceiver 414 is for providing LTE UE functionality, in effect emulating a user equipment, it may be connected via the same or different PCI-E bus, or by a USB bus, and may also be coupled to SIM card 418. First transceiver 412 may be coupled to first radio frequency (RF) chain (filter, amplifier, antenna) 422, and second transceiver 414 may be coupled to second RF chain (filter, amplifier, antenna) 424.

SIM card 418 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 400 is not an ordinary UE but instead is a special UE for providing backhaul to device 400.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 412 and 414, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 402 for reconfiguration.

A GPS module 430 may also be included, and may be in communication with a GPS antenna 432 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 432 may also be present and may run on processor 402 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 5:
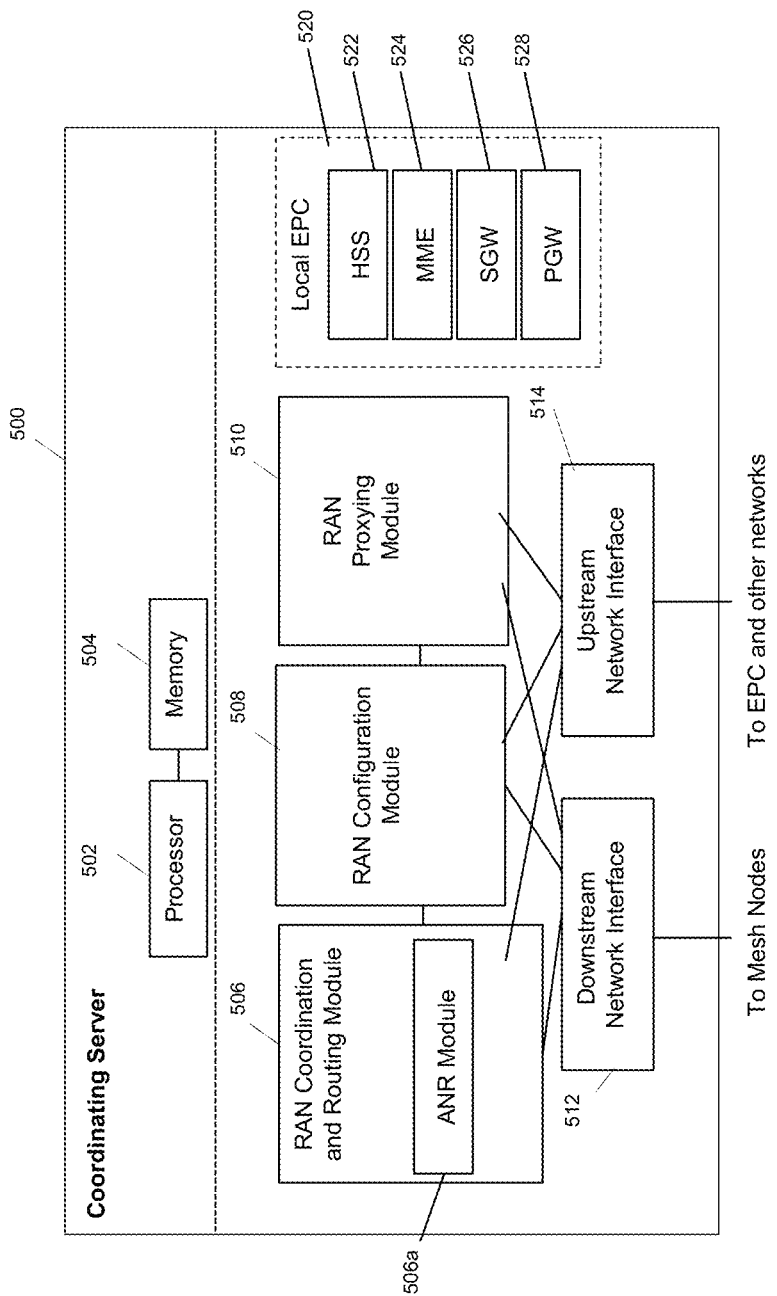
FIG. 5 is a coordinating server for providing services and performing methods as described herein, in accordance with some embodiments.

FIG. 5 is a diagram of a coordinating server for providing services and performing methods as described herein, in accordance with some embodiments. Coordinating server 500 includes processor 502 and memory 504, which are configured to provide the functions described herein. Also present are radio access network coordination/routing (RAN Coordination and routing) module 506, including ANR module 506a, RAN configuration module 508, and RAN proxying module 510. The ANR module 506a may perform the ANR tracking, PCI disambiguation, ECGI requesting, and GPS coalescing and tracking as described herein, in coordination with RAN coordination module 506 (e.g., for requesting ECGIs, etc.). In some embodiments, coordinating server 500 may coordinate multiple RANs using coordination module 506. In some embodiments, coordination server may also provide proxying, routing virtualization and RAN virtualization, via modules 510 and 508. In some embodiments, a downstream network interface 512 is provided for interfacing with the RANs, which may be a radio interface (e.g., LTE), and an upstream network interface 514 is provided for interfacing with the core network, which may be either a radio interface (e.g., LTE) or a wired interface (e.g., Ethernet).

Coordinator 500 includes local evolved packet core (EPC) module 520, for authenticating users, storing and caching priority profile information, and performing other EPC-dependent functions when no backhaul link is available. Local EPC 520 may include local HSS 522, local MME 524, local SGW 526, and local PGW 528, as well as other modules. Local EPC 520 may incorporate these modules as software modules, processes, or containers. Local EPC 520 may alternatively incorporate these modules as a small number of monolithic software processes. Modules 506, 508, 510 and local EPC 520 may each run on processor 502 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A method for resolving multiple contexts for a User Equipment (UE) in a wireless network, comprising:
    maintaining, for a first Radio Access Technology (RAT) controller and a second RAT controller, a centrally maintained database;
    determining, based on the contents of the centrally maintained database, when the UE is registering with the second RAT controller while currently registered with the first RAT controller; and
    sending, by the second RAT controller, a deregistration command to the first RAT controller the UE was registered with, wherein context is freed and wherein resources held at a base station are freed.

2. The method of claim 1 wherein hosting a first RAT controller comprises hosting one of a 2G RAT controller, a 3G RAT controller, a 4G RAT controller, and a 5G RAT controller.

3. The method of claim 1 wherein hosting a second RAT controller comprises hosting one of a 2G RAT controller, a 3G RAT controller, a 4G RAT controller, and a 5G RAT controller.

4. The method of claim 1 wherein maintaining a centrally maintained database comprises maintaining a centrally maintained database based on key International Mobile Subscriber Identity (IMSI)/International Mobile Equipment Identity (IMEI).

5. The method of claim 4 wherein maintaining a centrally maintained database comprises maintaining a database including at least one of IMSI, context-id, RAT, and Virtual Node Id.

6. The method of claim 5 wherein maintaining a centrally maintained database comprises maintaining a database including location information understandable by RAT (LA/RA/TA) which the UE is serving.

7. A system for resolving multiple contexts for a User Equipment (UE) in a wireless network, comprising:
    a UE;
    a first Radio Access Technology (RAT) controller in communication with the UE;
    a second Radio Access Technology (RAT) controller in communication with the UE; and
    a coordinating node for a first Radio Access Technology (RAT) controller and a second RAT controller, and maintaining a central database,
    wherein the coordinating node is configured to determine, based on the central database, when the UE is registering with the second RAT controller while currently registered with the first RAT controller;
    wherein the second RAT controller sends a deregistration command to the first RAT controller the UE was registered with; and
    wherein context and resources held at both the coordinating node and at a base station are freed.

8. The system of claim 7 wherein the first RAT controller is one of a 2G RAT controller, a 3G RAT controller, a 4G RAT controller, and a 5G RAT controller.

9. The system of claim 7 wherein the second RAT controller is one of a 2G RAT controller, a 3G RAT controller, a 4G RAT controller, and a 5G RAT controller.

10. The system of claim 7 wherein the centrally maintained database comprises a centrally maintained database based on key International Mobile Subscriber Identity (IMSI)/International Mobile Equipment Identity (IMEI).

11. The system of claim 10 wherein the centrally maintained database comprises a database including at least one of IMSI, context-id, RAT, and Virtual Node Id.

12. The system of claim 11 wherein the centrally maintained database comprises a database including location information understandable by RAT (LA/RA/TA) which the UE is serving.

13. A non-transitory computer-readable medium containing instructions for resolving multiple contexts for a User Equipment (UE) in a wireless network which, when executed, cause the wireless network to perform steps comprising:
maintaining, for a first Radio Access Technology (RAT) controller and a second RAT controller, a centrally maintained database;
determining, based on the contents of the centrally maintained database, when the UE is registering with the second RAT controller while currently registered with the first RAT controller; and
sending, by the second RAT controller, a deregistration command to the first RAT controller the UE was registered with, wherein context is freed and wherein resources held at a base station are freed.

14. The computer-readable medium of claim 13 wherein instructions for hosting a first RAT controller comprises instructions for hosting one of a 2G RAT controller, a 3G RAT controller, a 4G RAT controller, and a 5G RAT controller.

15. The computer-readable medium of claim 13 wherein instructions for hosting a second RAT controller comprises instructions for hosting one of a 2G RAT controller, a 3G RAT controller, a 4G RAT controller, and a 5G RAT controller.

16. The computer-readable medium of claim 13 wherein instructions for maintaining a centrally maintained database comprises instructions for maintaining a centrally maintained database based on key International Mobile Subscriber Identity (IMSI)/International Mobile Equipment Identity (IMEI).

17. The computer-readable medium of claim 16 wherein instructions for maintaining a centrally maintained database comprises instructions for maintaining a database including at least one of IMSI, context-id, RAT, and Virtual Node Id.

18. The computer-readable medium of claim 17 wherein instructions for maintaining a centrally maintained database comprises instructions for maintaining a database including location information understandable by RAT (LA/RA/TA) which the UE is serving.

* * * * *